United States Patent Office 3,824,267
Patented July 16, 1974

3,824,267
THIOLESTERS OF GUANIDINO ORGANIC ACIDS
Hiroyuki Ito, Suita, Yutaro Sasaki, Takatsuki, Shigetoshi Miyamoto, Osaka, Naohiro Kayama and Ikuo Kajiwara, Takatsuki, Yoichi Iguchi, Amagasaki, Kimiko Sakaguchi, Osaka, Kazuaki Hama, Ibaraki, Ikuko Yo, Osaka, Hiroko Tsutsui, Kawachinagano, Fusako Nishi, Nishinomiya, and Setsuro Fujii, Tokushima, Japan, assignors to Ono Pharmaceutical Co., Ltd., Osaka, Japan
No Drawing. Filed Aug. 14, 1972, Ser. No. 280,485
Claims priority, application Japan, Aug. 19, 1971, 46/63,277; June 28, 1972, 47/64,761
Int. Cl. C07c 129/00
U.S. Cl. 260—455 R    6 Claims

ABSTRACT OF THE DISCLOSURE

A compound having the general formula

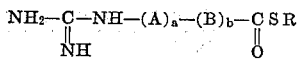

in which A is a straight chain or branched alkylene group having 1 to 10 carbon atoms, B is a bivalent aliphatic or alicyclic group, $a$ is 0 or 1, $b$ is 0 or 1, $a+b$ is 1 or 2 and R is any one of the straight chain or branched alkyl group and carbethoxyalkyl group having 1 to 10 carbon atoms, alycyclic group, aromatic group and phenylalkyl group, each of the above-mentioned alycyclic group and aromatic group may be substituted by a lower alkyl group, carbethoxy group, carbethoxy lower alkyl group, carboxy lower alkyl group, halogen, alkoxy group, acylamide group, alkylsulfonyl group, carboxy group, thiocarboxy group, mercaptocarbonyl group, nitro group or carbonyl group.

---

This invention relates to thioloesters of guanidinoorganic acids of the general formula:

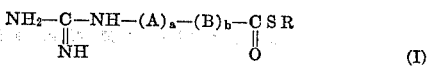

wherein A is a straight chain or branched alkylene group having 1 to 10 carbon atoms, $a$ is 0 or 1, B is any one of p-phenylene group, p-benzylene group and bivalent alicyclic group, $b$ is 0 or 1, $a+b$ is 1 or 2 and R is any one of straight chain or branched alkyl group and carbethoxyalkyl group having 1 to 10 carbon atoms, alicyclic group, aromatic group and aralkyl group and each of the above mentioned alicyclic group and aromatic group may be substituted by a lower alkyl group, carbethoxy group, carbethoxy lower alkyl group, carboxyalkyl group, halogen, alkoxy group, acrylamide group, alkylsulfonyl group, carboxy group, thiocarboxy group, mercaptocarbonyl group, nitro group or carbamoxyl group.

The present invention also relates to the production of the above mentioned thioloesters of guanidinoorganic acids and their salts with acids characterized by the reaction of guanidinoorganic acyl halides of the general formula:

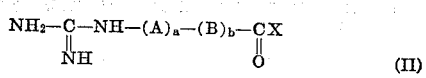

(wherein A, $a$, B and $b$ are as defined above, and X is halogen) with thiols of the general formula:

(wherein R is as defined above).

We have found that the above mentioned compounds (I) of this invention have strong antivirus action and antitrypsin action.

The above mentioned thioloesters (I) can be produced by the reaction of a guanidinoorganic acyl halide with a thiol in the presence of a dehydrohalogenation agent.

This reaction is represented by the following formula:

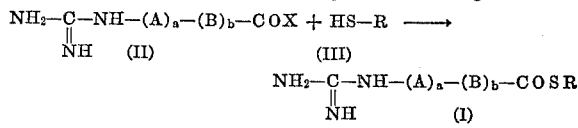

(wherein A, $a$, B, $b$, X and R are as defined above.

This reaction may be carried out as follows:

Thus the starting compound (III) is dissolved in a solvent and is made to react by the addition of the other compound (II) in the presence of a dehydrohalogenation agent.

The starting compounds (II) may be obtained according to the following process. That is to say, amino acids of the general formula:

$$NH_2—(A)_a—(B)_b—COOH \qquad (IV)$$

are converted to guanidino acids of the general formula:

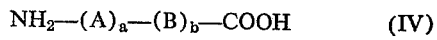

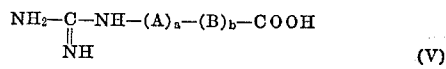

for example, by the reaction with cyanamide described in Chemische Berichte, vol. 43, page 2882 or by the reaction with S-methyl isothiourea as described in Japanese Patent Publication No. 20564/1963 or by the reaction with S-methyl nitroisothiourea, followed by the reduction of formed nitroguanidino acid. The obtained guanidino acids or their salts with organic acids, such as p-toluenesulfonic acid or methanesulfonic acid, hydrohalogenic acid, etc. are halogenized by a halogenizing reagent, such as thionyl chloride, phosphorus pentachloride, phosphorus trichloride, phosphorus pentabromide or phosphorus oxychloride, in the absence or presence of non-polar solvent, such as benzene, chloroform or carbon tetrachloride.

The reaction of the present invention will be explained in more detail. As this reaction is the condensation accompanied by the formation of hydrogen halide, it is advantageous to use a dehydrohalogenation agent to promote the reaction. As for the dehydrohalogenation agent, there can be used a tertiary amine or, if required, an inorganic base. As a tertiary organic amine, there can be used an aliphatic aromatic or heterocyclic amine, for example, triethylamine, tributylamine, dimethylaniline or pyridine. Particularly pyridine is preferable because it is useful also as a solvent. Further, as an inorganic base there can be used, for example, sodium bicarbonate, sodium carbonate or sodium hydroxide.

As a solvent there can be used, for example, benzene, toluene, tetrahydrofuran or pyridine. As described above, pyridine acts also as a dehydrohalogenation agent and is therefore particularly preferable.

Since the reaction proceeds comparatively fast, it may be carried out at the ordinary temperature or, if necessary, with a little cooling. Generally the reaction may be carried out at a temperature from 4° C. to the ordinary or room temperature.

The reaction time varies depending upon the reaction temperature to be used but it is generally 30 minutes to 4 hours, preferably 1.5 to 2.5 hours.

In carrying out the reaction, the starting material (III) is dissolved in a solvent, for example, tetrahydrofuran and the solution is added into the compound (II), and then a dehydrohalogenation agent is added thereto with stirring. Alternatively, the above compound (III) is dissolved in a solvent, preferably pyridine and the compound (II) is added to the above solution. When pyridine is used as a solvent, the compound (II) is not dissolved therein and therefore the reaction mixture is heterogeneous. However, the product (I) is soluble in pyridine, and therefore the reaction mixture becomes homogeneous with the progress of the reaction. In the case where any other solvent than pyridine is used, the reaction mixture is not always homogeneous but the reaction can be carried out in a heterogeneous system.

The desired product (I) is obtained as a salt with hydrogen halide or as a salt of the same acid as used for the starting material (II). The product may be separated and purified by the following post-treatment. That is to say, the reaction mixture is, if necessary, concentrated depending upon the used solvent, and treated with a solvent which does not dissolve the compound (I), for example, ether. Alternatively, the desired product is crystallized as the carbonate salt by adding sodium bicarbonate to the reaction product mixture. Particularly, when pyridine is used as a solvent, the carbonate salt of the product (I) is obtained as crystals by treating the reaction product mixture with sodium bicarbonate without evaporation and concentration. Of course, it is possible to recover the product (I) by the evaporation of the solvent, but it is preferable that the product (I) is crystallyzed as a salt as mentioned above, because in the latter case the product (I) is higher in the purity than in the former treatment.

The thus obtained product can be converted further, if required, to a salt with an inorganic acid, for example, hydrochloric acid, sulfuric acid, nitric acid, phosphoric acid or boric acid or with an organic acid, for example, oxalic acid, tartaric acid, acetic acid, propionic acid, succinic acid, malic acid, adipic acid, toluenesulfonic acid or methanesulfonic acid.

The above described reaction conditions and operations can be applied to all cases regardless of whether the carboxylic acid as the starting material is an alkyl- or phenyl-carboboxylic acid and regardless of whether the thiol is an alkyl or phenyl thiol.

The compounds (I) of the present invention are novel and are useful as medicines.

The compounds obtained by the procedure of the present invention are shown in Table 1.

TABLE 1

| Compound No. | —(A)$_a$—(B)$_b$— | R | Form of salt and m.p. (° C.) | Elementary analysis, percent | | | | | | | |
|---|---|---|---|---|---|---|---|---|---|---|---|
| | | | | Calcd. | | | | Found | | | |
| | | | | C | H | N | S | C | H | N | S |
| 1 | —(CH$_2$)$_5$— | 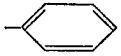 | Carbonate, 86 to 87. | 51.36 | 6.47 | 12.83 | 9.79 | 51.55 | 6.50 | 12.60 | 9.58 |
| 2 | Same as above | 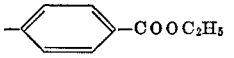—COOC$_2$H$_5$ | Phosphate, 133 to 135. | 44.14 | 5.98 | 9.66 | 7.36 | 44.38 | 6.50 | 9.70 | 7.77 |
| 3 | —(CH$_2$)$_4$— | 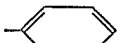 | Oxalate, 174 to 176. | 49.27 | 5.57 | 12.32 | 9.38 | 48.99 | 5.28 | 12.22 | 9.50 |
| 4 | Same as above | 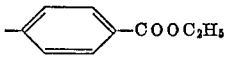—COOC$_2$H$_5$ | p-Tosylate, 121 to 125. | 53.22 | 5.84 | 8.46 | 12.90 | 53.25 | 6.00 | 8.34 | 13.03 |
| 5 | do | 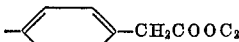—CH$_2$COOC$_2$H$_5$ | Carbonate, 79 to 81. | 51.11 | 6.31 | 10.52 | 8.03 | 51.34 | 6.48 | 10.31 | 7.81 |
| 6 | —(CH$_2$)$_5$— | —n-(CH$_2$)$_5$—CH$_3$ | Carbonate, 118 to 120. | 49.53 | 8.61 | 12.38 | 9.44 | 49.39 | 8.40 | 12.53 | 9.72 |
| 7 | Same as above | n-(CH$_2$)$_6$—CH$_3$ | Phosphate, 63 to 66. | 43.80 | 8.36 | 10.88 | 8.31 | 43.55 | 8.48 | 10.66 | 8.47 |
| 8 | do | —CH$_2$—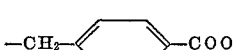—COOC$_2$H$_5$ | Phosphate, 118 to 119. | 45.42 | 6.28 | 9.35 | 7.13 | 45.64 | 6.41 | 9.18 | 7.35 |
| 9 | do | —CONH$_2$ | p-Tosylate, 184 to 185. | 51.41 | 5.75 | 11.42 | 13.07 | 51.31 | 5.77 | 11.23 | 13.41 |
| 10 | do | 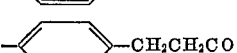—CH$_2$CH$_2$COO—C$_2$H$_5$ | p-Tosylate, 103 to 104. | 56.05 | 6.21 | 7.84 | 11.97 | 56.26 | 6.33 | 7.58 | 11.77 |
| 11 | do | —(CH$_2$)$_4$CH$_3$ | Phosphate, 68 to 71. | 40.34 | 7.84 | 11.76 | 8.96 | 40.52 | 7.91 | 11.65 | 8.68 |
| 12 | do | —(CH$_2$)$_3$CH$_2$COOC$_2$H$_5$ | Phosphate, 93 to 95 | 40.48 | 7.23 | 10.12 | 7.71 | 40.55 | 7.35 | 10.11 | 7.55 |
| 13 | do | 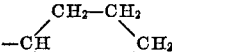 | Carbonate, 143 to 146. | 50.45 | 8.11 | 12.61 | 9.61 | 50.32 | 8.40 | 12.38 | 9.92 |
| 14 | do | 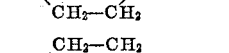 | Carbonate, 113 to 115. | 50.37 | 7.65 | 10.37 | 7.90 | 50.85 | 7.33 | 10.52 | 7.55 |
| 15 | do | —CH$_2$—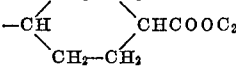 | p-Tosylate, 94 to 95. | 55.88 | 6.43 | 9.31 | 14.19 | 55.67 | 6.29 | 9.35 | 14.41 |
| 16 | do | 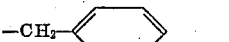—CH$_3$ | p-Tosylate, 136 to 138. | 55.88 | 6.43 | 9.31 | 14.19 | 55.61 | 6.39 | 9.74 | 14.25 |
| 17 | do | 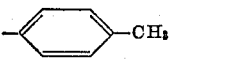—CH$_2$COOH | p-Tosylate, 143 to 146. | 53.33 | 5.86 | 8.48 | 12.93 | 53.61 | 5.75 | 8.64 | 12.88 |
| 18 | do | 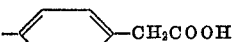—CH$_2$COOC$_2$H$_5$ | p-Tosylate, 79 to 83. | 55.07 | 6.31 | 8.03 | 12.24 | 55.30 | 6.55 | 8.01 | 12.25 |

TABLE 1—Continued

| Compound No. | —(A)ₐ—(B)ᵦ— | R | Form of salt and m.p. (°C.) | Calcd. C | Calcd. H | Calcd. N | Calcd. S | Found C | Found H | Found N | Found S |
|---|---|---|---|---|---|---|---|---|---|---|---|
| 19 | —(CH₂)₅— | —C₆H₄—CH₂CH₂COOH | p-Tosylate, 79 to 84. | 54.22 | 6.69 | 8.25 | 12.57 | 55.07 | 6.67 | 7.79 | 12.21 |
| 20 | do | —C₆H₄—Cl | p-Tosylate, 137 to 141. | 50.90 | 5.51 | 8.91 | 13.57 | 51.25 | 5.48 | 8.90 | 13.49 |
| 21 | do | —C₆H₄—NHCOCH₃ | p-Tosylate, 147 to 149. | 53.44 | 6.07 | 11.34 | 12.96 | 53.61 | 6.10 | 11.04 | 12.88 |
| 22 | do | —C₆H₄—OCH₃ | p-Tosylate, 130 to 132. | 53.96 | 6.21 | 8.99 | 13.70 | 54.11 | 6.24 | 8.93 | 13.75 |
| 23 | do | —C₆H₄—SO₂CH₃ | p-Tosylate, 148 to 150. | 48.93 | 5.63 | 8.16 | 18.64 | 48.78 | 5.83 | 8.01 | 18.71 |
| 24 | do | —C₆H₄—COOH | p-Tosylate, 154 to 156. | 52.39 | 5.61 | 8.73 | 13.30 | 52.11 | 5.55 | 8.54 | 13.48 |
| 25 | do | —C₆H₄(COOH) (ortho) | Free base, 200 to 201. | 54.37 | 6.15 | 13.59 | 10.36 | 54.18 | 6.33 | 13.70 | 10.33 |
| 26 | do | —C₆H₄(COOC₂H₅) (ortho) | Carbonate, 82 to 84. | 51.13 | 6.27 | 10.53 | 8.02 | 51.05 | 6.03 | 10.88 | 7.72 |
| 27 | do | —C₆H₄—COSH | p-Tosylate, 151 to 153. | 50.70 | 5.43 | 8.45 | 19.32 | 50.98 | 5.69 | 8.70 | 19.95 |
| 28 | do | —C₆H₄—CONH₂ | p-Tosylate, 184 to 185. | 52.50 | 5.83 | 11.66 | 13.33 | 52.25 | 5.99 | 11.72 | 13.85 |
| 29 | do | —C₆H₄—NO₂ | p-Tosylate, 121 to 123. | 49.79 | 5.39 | 11.61 | 13.28 | 49.49 | 5.10 | 10.94 | 13.50 |
| 30 | do | —C₆H₄(COOC₂H₅) (meta) | Carbonate, 93 to 96. | 56.12 | 6.01 | 9.35 | 7.13 | 56.26 | 6.33 | 9.71 | 7.22 |
| 31 | —(CH₂)₆— | —C₆H₄—COOC₂H₅ | p-Tosylate, 110 to 113. | 55.05 | 6.35 | 8.03 | 12.25 | 55.29 | 6.21 | 8.28 | 12.50 |
| 32 | cyclohexyl-1,2-diyl (—CH₂—CH(CH₂CH₂)CH—CH₂—CH₂—) | —C₆H₄—COOC₂H₅ | Phosphate, 161 to 164. | 46.85 | 6.07 | 9.11 | 6.94 | 47.01 | 6.21 | 8.75 | 7.1 |
| 33 |  | —(CH₂)₅—CH₃ | p-Tosylate, 157 to 159. | 55.87 | 6.43 | 9.31 | 14.19 | 55.56 | 6.57 | 9.52 | 14.32 |
| 34 | Same as above | —CH(CH₃)—CH(CH₃)—CH₃ | p-Tosylate, 168 to 170. | 54.92 | 6.18 | 9.61 | 14.65 | 54.95 | 6.28 | 9.57 | 14.78 |
| 35 | do | —C₆H₅ | Phosphate, 207 to 210. | 45.55 | 4.34 | 11.38 | 8.67 | 45.82 | 4.21 | 11.39 | 8.7 |
| 36 | do | —C₆H₄—COOC₂H₅ | Phosphate, 188 to 190. | 46.26 | 4.54 | 9.52 | 7.26 | 46.41 | 4.71 | 9.66 | 7.38 |
| 37 | do | —C₆H₄—Cl | Methane-sulfonate, 214 to 216. | 44.94 | 3.77 | 10.48 | 16.00 | 44.75 | 3.71 | 10.40 | 15.77 |
| 38 | do | —C₆H₄—CH₃ | Methane-sulfonate, 220 to 222. | 50.38 | 5.02 | 11.02 | 16.81 | 50.38 | 5.07 | 10.78 | 16.68 |
| 39 | do | —C₆H₄—COOH | p-Tosylate, 215 to 217. | 46.71 | 4.17 | 10.21 | 15.59 | 46.91 | 4.28 | 9.93 | 15.39 |
| 40 | do | —C₆H₄—CH₂COOH | Sulfate, 228 to 232. | 50.78 | 4.53 | 11.10 | 12.71 | 51.03 | 4.41 | 11.25 | 12.49 |
| 41 | do | —C₆H₄—CH₂COOC₂H₅ | Methane-sulfonate, 181 to 183. | 50.32 | 5.11 | 9.27 | 14.14 | 50.51 | 5.02 | 9.31 | 14.30 |
| 42 | —CH₂—C₆H₄— | —C₆H₄—COOC₂H₅ | Phosphate, 151 to 153. | 47.47 | 4.48 | 9.23 | 7.05 | 47.26 | 4.71 | 8.90 | 6.81 |

TABLE 1—Continued

| Compound No. | —(A)$_a$—(B)$_b$— | R | Form of salt and m.p. (° C.) | Calcd. C | Calcd. H | Calcd. N | Calcd. S | Found C | Found H | Found N | Found S |
| --- | --- | --- | --- | --- | --- | --- | --- | --- | --- | --- | --- |
| 43 | CH$_2$—C / \ —CH CH— \ / CH$_2$—CH$_2$ | —⟨ ⟩—COOC$_2$H$_5$ | Carbonate, 113 to 115. | 52.54 | 6.13 | 10.21 | 7.79 | 52.76 | 6.01 | 10.47 | 7.65 |
| 44 | —⟨ ⟩—CH$_2$— | ...do... | Carbonate, 217 to 220. | 54.40 | 5.05 | 10.02 | 7.64 | 54.13 | 5.71 | 10.26 | 7.79 |

The present invention will be further explained by means of the following Examples.

EXAMPLE 1

Synthesis of ester of ε-guanidinocaproic acid with paracarbethoxythiophenol phosphate 14 g. of ε-guanidinocaproic acid was added into 90 g. of thionyl chloride with stirring, and the mixture was stirred at the room temperature for 30 minutes. Then petroleum ether was added thereto and the deposited crystals were recovered by filtration. The crystals were added into a mixture of 12 g. of ethylparamercaptobenzoate and 25 ml. of pyridine, stirred for 2 hours, made a carbonate with a sodium bicarbonate solution and then made phosphonate by adjusting the pH to 3 with phosphoric acid. After cooling, the formed crystals were recovered by filtration, and recrystallized from water to obtain white scaly crystals.

Yield: 12 g. (34.1%)
Melting point: 133 to 135° C.
Elemental analysis (percent).— Calcd.: C, 44.14; H, 5.98; N, 9.66; S, 7.36. Found: C, 44.38; H, 6.17; N, 9.70; S, 7.77.

EXAMPLE 2

Synthesis of ester of ε-guanidinocaproic acid with thiophenol bicarbonate

ε-Guanidinocaproyl chloride and thiophenol were made to react in the same manner as described in Example 1 to obtain the carbonate.

Melting point: 86 to 87° C.
Elemental analysis: (percent).—Calcd.: C, 51.36; H, 6.47; N, 12.83; S, 9.79. Found: C, 51.55; H, 6.50; N, 12.60; S, 9.58.

EXAMPLE 3

Synthesis of ester of δ-guanidinovaleric acid with p-carbethoxyphenyl thiol p-toluene sulfonate 9.1 g. of δ-guanidinovaleric acid tosyl salt and 27 g. g. of thionyl chloride were made to react at the room temperature for 35 minutes. The reaction mixture was washed three times with 100 ml. of ether to obtain an oily residue. Then 5 g. of ethyl-p-mercaptobenzoate in 25 ml. of tetrahydrofuran was added into the above oily residue and 12 ml. of pyridine was added gradually with stirring. The mixture was left standing overnight, washed with ether, and then water was added thereto to crystallize. The crystal was taken by filtration and recrystallized from water.

Yield: 84.5%
Sakaguchi reaction: Positive.
Melting Point: 121 to 125° C.
Elemental analysis (percent).—C$_{15}$H$_{21}$N$_3$O$_3$S·C$_7$H$_8$O$_3$S, Calcd.: C, 53.22; H, 5.84; N, 8.46; S, 12.90. Found: C, 53.25; H, 6.01; N, 8.34; S, 13.03.

EXAMPLE 4

Ester of ε-guanidinocaproic acid with n-amyl mercaptan phosphate 4.10 g. of ε-guanidinocaproic acid and 18.9 g. of thionyl chloride were made to react at the room temperature for 30 minutes. Petroleum ether was added to the reaction mixture, and the deposited crystals of the acyl chloride were recovered by filtration. The crystals were added into 2.46 g. of n-amylmercaptan in 6.51 g. of pyridine under ice-cooling and were made to react at the room temperature for 2 hours with stirring and then added with a saturated aqueous solution of sodium bicarbonate to deposit crystals of the carbonate. The crystal was recovered by filtration and washed with water and acetone. The yield was 5.05 and the melting point was 112 to 116° C. This product was suspended in 30 ml. of ethanol, and added with a calculated amount (1.86 g.) of phosphoric acid with warming and the solution was filtered and the filtrate was cooled to obtain crystals of the phosphate.

Yield: 4.34 g. (51.1%)
Melting point: 68 to 71° C.
Sakaguchi reaction: Positive.
Elemental analysis (percent) for C$_{12}$H$_{25}$N$_3$OS·H$_3$PO$_4$.— Calcd.: C, 40.34; H, 7.84; N, 11.76; S, 8.96. Found: C, 40.52; H, 7.91; N, 11.65; S, 8.68.

EXAMPLE 5

Synthesis of ester of ε-guanidinocaproic acid with m-carbethoxythiophenol carbonate The acyl chloride obtained according to Example 1 was made to react with ethyl m-mercaptobenzoate in pyridine and then obtained as the carbonate.

Yield: 45.2%
Melting point: 82 to 84° C.
Elemental analysis (percent) for C$_{16}$H$_{23}$N$_3$O$_3$S·H$_2$CO$_3$.— Calcd.: C, 51.13; H, 6.27; N, 10.53; S, 8.02. Found: C, 51.05; H, 6.03; N, 10.88; S, 7.72.

EXAMPLE 6

Synthesis of ester of α-guanidino-p-toluic acid with p'-ethoxycarbonylthiophenol phosphate 12 g. of thionyl chloride was added to 1.44 g. of p-guanidinomethyl benzoic acid and kept at 55 to 65° C. for 50 minutes so as to prepare the acyl chloride. The excess thionyl chloride was distilled away under reduced pressure. The residue was washed with hexane, dried under reduced pressure to obtain powder. This acryl chloride hydrochloride powder was added into 1.91 g. of ethyl p-mercaptobenzoate in 5 ml. of pyridine on cooling and stirred at the room temperature for 3 hours. Then an aqueous solution of sodium bicarbonate was added thereto and the formed carbonate was recovered by filtration. The melting point was 119 to 121° C. The crystal of this carbonate was suspended in water and adjusted to pH 2 with phosphoric acid. The formed crystals of the phosphonate were recrystallized from water to obtain scaly white crystals.

Yield: 1.50 g. (43%)
Melting point: 151 to 153° C.

The starting compound, p-guanidinomethyl benzoic acid (α-guandino-p-toluic acid) was obtained by mixing 2.50 g. of α-amino-p-toluic acid, 2.95 g. of S-methyl-isothiourea sulfate, 10.85 ml. of 2N-NaOH and 8 ml.

EXAMPLE 7

Synthesis of ester of 4-guanidinomethylcyclohexane-1-carboxylic acid with p-ethoxycarbonylthionphenol phosphate 6 g. of thionyl chloride was added to 1.50 g. of 4-guanidinomethylcyclohexane-1-carboxylic acid at the room temperature and kept at 30 to 40° C. for 30 minutes to make the acyl chloride. The excess thionyl chloride was removed by adding petroleum ether, and remaining thionyl chloride was removed completely under reduced pressure. Then, 5.25 g. of pyridine was added thereto on cooling at 0° C. and then 1.37 g. of ethyl p-mercaptobenzoate was added thereto and the mixture was made to react at the room temperature for 2.5 hours with stirring. Then pyridine was distilled away at low temperature under a little reduced pressure. An aqueous solution of sodium bicarbonate was added to the residue to obtain the carbonate as crystals.

Yield: 1.052 g.
Melting point: 110 to 115° C.

A part of the crystals was suspended in water, acidified with phosphoric acid and then the crystal of the phosphate was obtained (M.P. 161–164° C.).

When p-toluenesulfonic acid was used instead of phosphoric acid, a p-toluenesulfonate was obtained (m.p. 198 to 201 C°.).

The starting material, 4-guanidinomethyl-cyclohexane-1-carboxylic acid, was obtained by the reaction of S-methylisothiourea and 4-aminomethyl-cyclohexane-1-carboxylic acid which was obtained by catalytic reduction of p-aminomethylbenzoic acid at 60° C. and 20 to 40 atmopsheric pressure with platinum oxide in acetic acid according to M. Levine and R. Sedlecky in J. Org. Chem., *1959* 115.

EXAMPLE 8

Synthesis of ester of p-guanidinobenzoic acid with p'-carbethoxythiophenol phosphate 39 g. of thionyl chloride was added to 5.88 g. of p-guanidinobenzoic acid, heated under reflux for 30 minutes, then petroleum ether was added. The acyl halide hydrochloride was obtained as crystals by filtration. These crystals were added to 5.98 g. of ethyl p-mercaptobenzoate in 13.0 g. of pyridine and the mixture was stirred at the room temperature for 2 hours. Then an aqueous solution of sodium bicarbonate was added thereto to obtain crystals of the carbonate (m.p. 117 to 120° C.).

These crystals were suspended in water, adjusted to pH about 3 with phosphoric acid and further the same amount of ethanol was added thereto and was heated to dissolve. The solution was then cooled to obtain crystals of the phosphate.

Yield: 5.94 g. (40%)
M.p.: 188 to 190° C.

The starting material, p-guanidinobenzoic acid was synthesized according to German Pat. No. 950,637 (1956) (CA 53 6226i). Thus 16.2 g. of p-aminobenzoic acid, 8 ml. of water, 9.7 ml. of concentrated hydrochloric acid and 11.5 g. of cyanamide were mixed together and heated to 80° C. Then 20 ml. of 1N–HCl was added to the solution and stirred at this temperature for 30 minutes and then cooled to obtain crystals. The crystals were recovered by filtration, washed with dilute hydrochloric acid and then neutralized with an aqueous solution of sodium carbonate to obtain crystals of p-guanidinobenzoic acid at the yield of 10.1 g. (47.8%). When the mother solution was neutralized with sodium carbonate, 5.9 g. (27.9%) of the desired product was further obtained.

EXAMPLE 9

Synthesis of ester of 4-guanidinocyclohexane-1-carboxylic acid with p'-carbethoxythiophenol carbonate 6 g. of thionyl chloride was added to 897 mg. of 4-guanidinocyclohexane-1-carboxylic acid, the mixture was stirred at the room temperature for 15 minutes, then hexane was added to remove the excess thionyl chloride and the residue was kept under reduced pressure to distil away remaining thionyl chloride. Then 885 mg. of ethyl p-mercaptobenzoate in 4.0 g. of pyridine was added to the residue on cooling, and stirred for 4 hours with gradual elevation of the temperature to the room temperature. An aqueous solution of sodium bicarbonate was added to the reaction mixture to obtain crystals of the carbonate (melting point of 113 to 115° C.). Yield 351 mg.

The starting material, 4-guanidinocyclohexane-1-carboxylic acid was synthesized as follows. Thus 4-aminobenzoic acid was catalytically reduced at 60° C. under 30 to 40 atmospheres for 5 hours with platinum oxide in acetic acid in an autoclave to obtain 4-aminocyclohexane-1-carboxylic acid. 2.0 g. of this acid was made to react with 1.91 g. of S-methylnitroisothiourea and 0.604 g. of NaOH in 23 ml. of water at the room temperature overnight, the reaction mixture was acidified with HCl, the deposited crystals were recovered by filtration and recrystallized from water to obtain 4-nitroguanidinocyclohexane-1-carboxylic acid (melting point of 225 to 229° C.) at the yield of 2.32 g. Then 3.23 g. of 4-nitroguanidinocyclohexane-1-carboxylic acid was reduced catalytically at the room temperature with 300 mg. of palladium black in 3.37 g. of acetic acid and 100 ml. of methanol, the catalyst was filtered off, then the solvent was distilled away under reduced pressure and the residue was dissolved in water and neutralized with an aqueous solution of NaOH to obtain crystals of 4-guanidinocyclohexane-1-carboxylic acid (melting point not lower than 300° C.) at the yield of 1.50 g. It gave a positive Sakaguchi reaction.

EXAMPLE 10

Synthesis of ester of p-guanidinophenylacetic acid with p'-carbethoxythiophenol 3.25 g. of thionyl chloride was added to 325 mg. of p-guanidinophenylacetic acid and kept at 27° C. for 10 minutes and the excess thionyl chloride was removed. 325 mg. of p-carbethoxythiophenol in 10 g. of pyridine was added to it and elevated gradually the temperature to the room temperature with stirring and made to react for 3 hours. An aqueous solution of sodium bicarbonate was added to the reaction mixture to obtain the carbonate.

Yield. 85 mg.
Melting point: 217–220° C.
Elemental analysis (percent).—Calcd.: C, 54.40; H, 5.05; N, 10.02; S, 7.64. Found: C, 54.13; H, 5.71; N, 10.26; S, 7.77.

The raw material, p-guanidinophenyl acetic acid was obtained by the catalytic reduction with palladium black of p-nitroguanidinophenyl acetic acid which was prepared by the reaction of p-aminophenyl acetic acid with S-methylnitroisothiourea.

EXAMPLE 11

The other esters of guanidino carboxylic acids with thiols are synthesized in the same manner as Examples 1 to 10. The melting points and the elemental analysis of these compounds were shown in Table 1.

The compounds of this invention are white or substantially white crystals and give a positive Sakaguchi reaction. Their solubilities in water are different depending on the kind of the salt.

The compounds of the present invention (including their salts with acids) show high biological activities and are effective against pathogen, particularly Myxovirus.

Therefore, the compounds of the present invention are effective for the therapy of infections diseases caused by pathogen, particularly infectious diseases of the upper respiratory tract.

On the other hand, the compounds of the present invention have excellent spectra of the antitrypsin action and are useful for hemarrhagic and pancreatitis, caused from the activation of trypsin in a living body, and useful as hemostatics at the shock and as antiphlogistics.

For example, ester of ε-guanidino caproic acid with p-carbethoxythiophenol phosphate, one of the compounds of this invention, showed a complete inhibitory effect at 25 γ/ml. (in physiological saline solution) in the screening test with the indication of the inhibition against cell cytopathic effect caused by Sendai-virus (HVJ), a kind of Parainfluenza-virus, and the same compound showed a complete inhibitory effect against the multiplication of Sendai virus in the allantoic fluid of embryonated egg at the dose of 1000 γ/egg, from both of inhibition of its hemagglutination using erythrocyto of guinea pig and normal hatching of egg.

In the toxicity test, $LD_{50}$ of the above compound was 150 mg./kg. (intravenous injection) in mice and from this value it is confirmed that it has a low toxicity.

Further, for example, ester of δ-guanidinovaleric acid with p-carbethoxythiophenol p-toluene sulfonate (No. 4 in Table 1) showed a remarkable inhibitory effect at 50 γ/ml. in the inhibition of cell cytopathic effect by parainfluenza-virus/Sendai. The said compound (No. 4) showed a complete inhibitory effect against the multiplication of Influenza $A_2$ virus/Kumamoto in the allantoic fluid of embryonated egg at the dose of 1000 γ/egg from both of inhibition of its hemagglutination and normal hatching of egg.

A therapeutic effect was observed in mice through intranasal infection of influenza $A_2$ virus/Kumamoto. When the above compound (No. 4) was administered eight times each 100 mg./kg. during from the day before the infection to the second day after the infection, survival rate on the eighth day was 30%. On the other hand, on the control group (20 examples) survival rate was 0%. That is to say, it is conformed that the compound (No. 4) has a marked effect.

The anti-trypsin activity was investigated for the ester-hydrolysis effect of trypsin. The above compound (No. 4) showed 50% inhibition of the hydrolysis of 7.5 mM of Arginine methylester·p-toluenesulfonate with 0.5γ of trypsin at 37° C. for 30 minutes. Ester of ε-guanidino caproic acid with n-amyl-mercaptan carbonate (No. 11 in Table 1) showed an inhibitory effect at 50 γ/ml. in the inhibition of cell cytopathic effect of Parainfluenza virus/Sendai (HVJ) and showed the anti-trypsin effect at the concentration of $3.8 \times 10^{-4}$ M.

Ester of ε-guanidino caproic acid with m-carbethoxythiophenol carbonate (No. 26 in Table 1) showed an inhibitory effect against the multiplication of Influenza virus/Kumamoto in the allantoic fluid of embryonated egg at the dose of 1000 γ/egg and showed the anti-tripsin effect at the concentration of $7.5 \times 10^{-5}$ M.

Table 2 shows the inhibitory effect against cell cytopathic effect caused by Parainfluenza virus/Sendai (HVJ) of the compounds of this invention in Table 1. (by concentration of inhibition)

TABLE 2

| Compound No. in Table 1: | Concentration of inhibition (γ/ml.) |
|---|---|
| 16 | 25 |
| 17 | 100 |
| 19 | 50 |
| 21 | 25 |
| 22 | 20 |
| 23 | 50 |
| 24 | 25 |
| 25 | 100 |

Table 3 shows the anti-trypsin effect of the compounds of this invention in Table 1 (by the concentration of 50% inhibition).

TABLE 3

| Compound No.: | Concentration of 50% inhibition (M) |
|---|---|
| 12 | $7.5 \times 10^{-4}$ |
| 13 | $1.5 \times 10^{-3}$ |
| 15 | $1.1 \times 10^{-4}$ |
| 16 | $7.6 \times 10^{-5}$ |
| 18 | $3.8 \times 10^{-5}$ |
| 20 | $7.4 \times 10^{-5}$ |
| 21 | $7.2 \times 10^{-5}$ |
| 29 | $1.0 \times 10^{-5}$ |
| 36 | $3.5 \times 10^{-8}$ |

What is claimed is:
1. A compound of the general formula

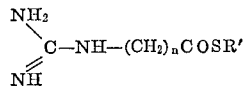

wherein n is any one of 3, 4, 5 or 6 and R' is phenyl or p-ethoxycarbonylphenyl.

2. A compound of claim 1 selected from the group consisting of:
(1) ester of ε-guanidinocaproic acid with thiophenol,
(2) ester of ε-guanidinocaproic acid with p-carbethoxythiophenol,
(3) ester of δ-guanidinovaleric acid with thiophenol,
(4) ester of δ-guanidinovaleric acid with carbethoxythiophenol,
(5) ester of δ-guanidinovaleric acid with p-mercaptophenylacetic acid ethyl ester,
(6) ester of ε-guanidinocaproic acid with n-hexylmercaptan,
(7) ester of ε-guanidinocaproic acid with n-heptylmercaptan,
(8) ester of ε-guanidinocaproic acid with p-carbethoxybenzylmercaptan,
(9) ester of ε-guanidinocaproic acid with p-mercaptobenzamide,
(10) ester of ε-guanidinocaproic acid with p-mercaptophenylpropionic acid ethylester,
(11) ester of ε-guanidinocaproic acid with n-amylmercaptan,
(12) ester of ε-guanidinocaproic acid with 5-mercaptopentanoic acid ethylester,
(13) ester of ε-guanidinocaproic acid with cyclohexylmercaptan,
(14) ester of ε-guanidinocaproic acid with 4-mercaptocyclohexane-1-carboxylic acid ethylester,
(15) ester of ε-guanidinocaproic acid with benzylmercaptan,
(16) ester of ε-guanidinocaproic acid with p-mercaptotoluene,
(17) ester of ε-guanidinocaproic acid with p-mercaptophenylacetic acid,
(18) ester of ε-guanidinocaproic acid with p-mercaptophenylacetic acid ethylester,
(19) ester of ε-guanidinocaproic acid with p-mercaptophenylpropionic acid,
(20) ester of ε-guanidinocaproic acid with p-chlorothiophenol,
(21) ester of ε-guanidinocaproic acid with p-mercaptoacetoanilide,
(22) ester of ε-guanidinocaproic acid with p-methoxythiophenol,
(23) ester of ε-guanidinocaproic acid with p-methylsulfonylthiophenol,
(24) ester of ε-guanidinocaproic acid with p-mercaptobenzoic acid,
(25) ester of ε-guanidinocaproic acid with o-mercaptobenzoic acid,

(26) ester of ε-guanidinocaproic acid with m-mercaptoethylbenzoate,
(27) ester of ε-guanidinocaproic acid with p-mercaptothiobenzoic acid,
(28) ester of ε-guanidinocaproic acid with p-mercaptobenzamide,
(29) ester of ε-guanidinocaproic acid with p-nitrothiophenol,
(30) ester of ε-guanidinocaproic acid with 5'-ethoxycarbonyl-1'-thionaphthol,
(31) ester of ω-guanidinoheptanoic acid with p-mercaptoethylbenzoate,
(32) ester of 4-guanidinomethylcyclohexane-1-carboxylic acid with p-mercaptoethylbenzoate,
(33) ester of α-guanidino-p-toluic acid with p'-mercaptoethylbenzoate,
(34) ester of 4-guanidinocyclohexane-1-carboxylic acid with p-mercaptoethylbenzoate.

3. A compound of the general formula:

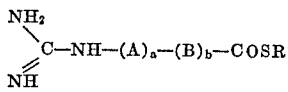

wherein A is a straight chain or branched alkylene group having 1 to 10 carbon atoms, B is a bivalent aliphatic or alicyclic group, $a$ is 0 or 1, $b$ is 0 or 1, $a+b$ is 1 or 2 and R is any one of the straight chain or branched alkyl group and carbethoxyalkyl group having 1 to 10 carbon atoms, alicyclic group, aromatic group and phenylalkyl group each of the above mentioned alicyclic group and aromatic group may be substituted by a lower alkyl group, carbethoxy group, carbethoxy lower alkyl group, carboxy lower alkyl group, halogen, alkoxy group, acylamide group, alkylsulfonyl group, carboxy group, thiocarboxy group, mercaptocarbonyl group, nitro group or carbonyl group.

4. The compound of claim 3 in which A is a straight chain alkylene group having five carbon atoms, $a$ is 1, $b$ is 0 and R is phenyl.

5. The compound of claim 3 in which A is a straight chain alkylene group having five carbon atoms, $a$ is 1, $b$ is 0 and R is p-chlorophenyl.

6. The compound of claim 3 in which A is a straight chain alkylene group having five carbon atoms, $a$ is 1, $b$ is 0 and R is p-methylphenyl.

References Cited

UNITED STATES PATENTS 2,251,946  9/1941  Lott _____ 260—455 R

FOREIGN PATENTS 2,050,484  4/1971  Germany _____ 260—455 R

OTHER REFERENCES

Schleppnik et al.: J. Org. Chem., Vol. 29, No. 7, July 13, 1964, pp. 1910–1915.
Chem. Abstracts, 6407p, Vol. 74, 1971.
Chem. Abstracts, 54326z, Vol. 70, 1969.

ELBERT L. ROBERTS, Primary Examiner

D. R. PHILLIPS, Assistant Examiner

U.S. Cl. X.R.

260—534 R, 544 R; 424—301